(12) United States Patent
Izenberg

(10) Patent No.: US 9,444,914 B2
(45) Date of Patent: Sep. 13, 2016

(54) CONFIGURABLE PARSER AND A METHOD FOR PARSING INFORMATION UNITS

(71) Applicant: Annapurna Labs Ltd., Yoekneam (IL)

(72) Inventor: Erez Izenberg, Tel-Aviv (IL)

( * ) Notice: Subject to any disclaimer, the term of this patent is extended or adjusted under 35 U.S.C. 154(b) by 237 days.

(21) Appl. No.: 14/027,257

(22) Filed: Sep. 16, 2013

(65) Prior Publication Data

US 2015/0081726 A1 Mar. 19, 2015

(51) Int. Cl.
| | |
|---|---|
| G06F 17/30 | (2006.01) |
| H04L 29/06 | (2006.01) |
| H04L 12/861 | (2013.01) |
| H04L 12/931 | (2013.01) |
| H04L 12/721 | (2013.01) |
| H04L 12/741 | (2013.01) |
| H04L 1/00 | (2006.01) |
| G06F 9/30 | (2006.01) |
| G06F 13/38 | (2006.01) |

(52) U.S. Cl.
CPC ............ *H04L 69/22* (2013.01); *G06F 17/30* (2013.01); *G06F 17/30545* (2013.01); *G06F 17/30563* (2013.01); *G06F 17/30943* (2013.01); *G06F 17/30985* (2013.01); *H04L 45/38* (2013.01); *H04L 45/74* (2013.01); *H04L 49/602* (2013.01); *H04L 49/90* (2013.01); *H04L 69/02* (2013.01); *G06F 9/3001* (2013.01); *G06F 13/385* (2013.01); *H04L 1/0066* (2013.01)

(58) Field of Classification Search
None
See application file for complete search history.

(56) References Cited

U.S. PATENT DOCUMENTS

| | | | | |
|---|---|---|---|---|
| 6,650,640 B1* | 11/2003 | Muller | ................... | H04L 49/90 370/392 |
| 7,188,168 B1* | 3/2007 | Liao | ................... | H04L 69/22 709/224 |
| 8,638,793 B1* | 1/2014 | Ben-Mayor | ............. | H04L 45/38 370/389 |
| 8,898,204 B1* | 11/2014 | Sathe | ..................... | G06F 17/30 707/812 |
| 2004/0120349 A1* | 6/2004 | Border | ................... | H04L 1/0066 370/474 |
| 2005/0004908 A1* | 1/2005 | Ben-Haim | ............. | G06F 13/385 |
| 2007/0047457 A1* | 3/2007 | Harijono | ................ | H04L 49/90 370/250 |
| 2009/0092136 A1* | 4/2009 | Nazareth | ............... | H04L 45/745 370/392 |
| 2011/0069719 A1* | 3/2011 | Fries, IV | ............ | H04L 12/2836 370/463 |
| 2012/0226804 A1* | 9/2012 | Raja | ...................... | H04L 43/028 709/224 |
| 2014/0208069 A1* | 7/2014 | Wegener | ............... | G06F 9/3001 712/22 |

OTHER PUBLICATIONS

Jung, Minsoo, et al. "A dynamic construction algorithm for the Compact Patricia trie using the hierarchical structure." Information processing & management 38.2 (2002): 221-236.*

Jonnalagedda M, Coppey T, Stucki S, Rompf T, Odersky M. Staged parser combinators for efficient data processing. InAcm Sigplan Notices Oct. 15, 2014 (vol. 49, No. 10, pp. 637-653). ACM.*

* cited by examiner

*Primary Examiner* — Ranodhi Serrao
*Assistant Examiner* — James Fiorillo
(74) *Attorney, Agent, or Firm* — Kilpatrick Townsend & Stockton LLP

(57) ABSTRACT

A system that includes a first interleaved sequence of configurable parsing engines and concatenating modules. Each parsing engine is followed by a concatenating module. The first interleaved sequence is arranged to process an information unit. Different portions of the information unit are processed by different configurable parsing engines. At least one configurable parsing engine is arranged to (a) process of a portion of the information unit in response to a previous processing result provided from a previous configurable parting engine; and to (b) generate a current processing result to be used by a next configurable parsing engine.

14 Claims, 10 Drawing Sheets

| Source_VLAN_count | Add | Del | Input Packet Format | Output Packet Format |
|---|---|---|---|---|
| 00 | 1 | 0 | DA SA Data | DA SA VLAN 1 new Data |
| 00 | 2 | 0 | DA SA Data | DA SA VLAN 1 new VLAN 2 new Data |
| 01 | 1 | 0 | DA SA VLAN 1 Data | DA SA VLAN 1 new VLAN 1 Data |
| 01 | 1 | 1 | DA SA VLAN 1 Data | DA SA VLAN 1 new Data |
| 01 | 2 | 1 | DA SA VLAN 1 Data | DA SA VLAN 1 new VLAN 2 new Data |
| 01 | 2 | 0 | DA SA VLAN 1 Data | DA SA VLAN 1 new VLAN 2 new VLAN 1 Data |
| 10 | 1 | 1 | DA SA VLAN 1 VLAN 2 Data | DA SA VLAN 1 new VLAN 2 Data |
| 10 | 2 | 2 | DA SA VLAN 1 VLAN 2 Data | DA SA VLAN 1 new VLAN 2 new Data |

CONFIGURABLE PARSER AND A METHOD FOR PARSING INFORMATION UNITS

BACKGROUND

Network interfaces (e.g. Ethernet NIC, fiber channel, Infiniband) requires parsing of incoming packets to detect the priority, class of service and detect the high layer protocols, this information is used to forward the packet to destination queue and CPU or virtual machine (VM), this also helps to offload SW tasks.

Converged Network Adapter supports reception and transmission of multiple protocols at the same time, in some cases the protocols are encapsulated using tunneling protocols (for example FCoE, IP over IP, GRE, etc.)

Modern network adapter also supports many hardware acceleration engines to offload the software driver and the network stack.

Example for such acceleration is IPv4 or TCP checksum offload, this require detection the packet protocols and the protocol header offsets.

In today network environment, where many network protocol exist simultaneously, it is necessary to implement parsing engines that will be flexible enough to support multiple standard simultaneously, will be able to handle proprietary packet implementation and future protocol and will be efficient (data rate, area, power, SW utilization)

SUMMARY

According to an embodiment of the invention various methods may be provided and are described in the specification. Additional embodiments of the invention include a system arranged to execute any or all of the methods.

According to an embodiment of the invention the method may include providing an information unit multiple configurable parsing engines; processing different portions of the information unit by different configurable parsing engines; wherein the processing may include processing, by at least one configurable parsing engine, a portion of the information unit in response to a previous processing result provided from a previous configurable parting engine and generating a current processing result to be used by a next configurable parsing engine.

The method may include providing the information unit to a first interleaved sequence of the configurable parsing engines and concatenating modules; wherein each parsing engine may be followed by a concatenating module; wherein the first interleaved sequence is arranged to process an information unit.

The method may include configuring each configurable parsing engine by providing to the configurable parsing engine information unit portion limit metadata indicative of a location of an information unit portion to be processed by the configurable parsing engine.

The method may include configuring each configurable parsing engine by providing to the configurable parsing engine processing metadata indicative of a manner in which the information unit portion should be processed by the configurable parsing engine.

The method wherein the current processing result may include a command directed to the next configurable parsing engine.

The method may include configuring different configurable parsing engines to process information unit portions that relate to different protocol suit levels.

The method may include generating by one or more configurable parsing engines a current processing result to be used by anther module of a communication controller.

The method may include distributing information unit between multiple interleaved sequences of configurable parsing engines and concatenating modules; wherein the multiple interleaved sequences may include the first interleaved sequence.

The distributing may include applying a load balancing scheme in order to distribute the information units.

The current processing result may be indicative of an offset to a header length indicator included in a portion of the information unit to be processed by the next configurable parsing engine.

According to an embodiment of the invention a system may be provide and may include multiple configurable parsing engines; wherein different portions of an information unit are processed by different configurable parsing engines; and wherein at least one configurable parsing engine may be arranged to (a) process of a portion of the information unit in response to at least previous processing result provided from a previous configurable parsing engine; and to (b) generate a current processing result to be used by a next configurable parsing engine.

The system multiple configurable parsing engines and concatenating modules may form a first interleaved sequence; wherein each parsing engine is followed by a concatenating module.

The system wherein each configurable parsing engine may be arranged to be configured by receiving information unit portion limit metadata indicative of a location of an information unit portion to be processed by the configurable parsing engine.

The system wherein each configurable parsing engine may be arranged to be configured by receiving processing metadata indicative of a manner in which the information unit portion should be processed by the configurable parsing engine.

The system wherein the current processing result may include a command directed to the next configurable parsing engine.

The different configurable parsing engines are configured to process information unit portions that relate to different protocol suit levels.

One or more configurable parsing engines may be arranged to generate a current processing result to be used by another module of the system.

The system may include a distribution module and multiple interleaved sequences of configurable parsing engines and concatenating modules; wherein the multiple interleaved sequences may include the first interleaved sequence; wherein the distribution module may be arranged to distribute information units between the multiple interleaved sequences of configurable parsing engines and concatenating modules.

The distribution module may be arranged to apply a load balancing scheme in order to distribute the information units.

The current processing result may be indicative of an offset to a header length indicator included in a portion of the information unit to be processed by the next configurable parsing engine.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 8 illustrates various examples of frames that were modified by the programmable header builder according to various embodiments of the invention.

Figure 1:
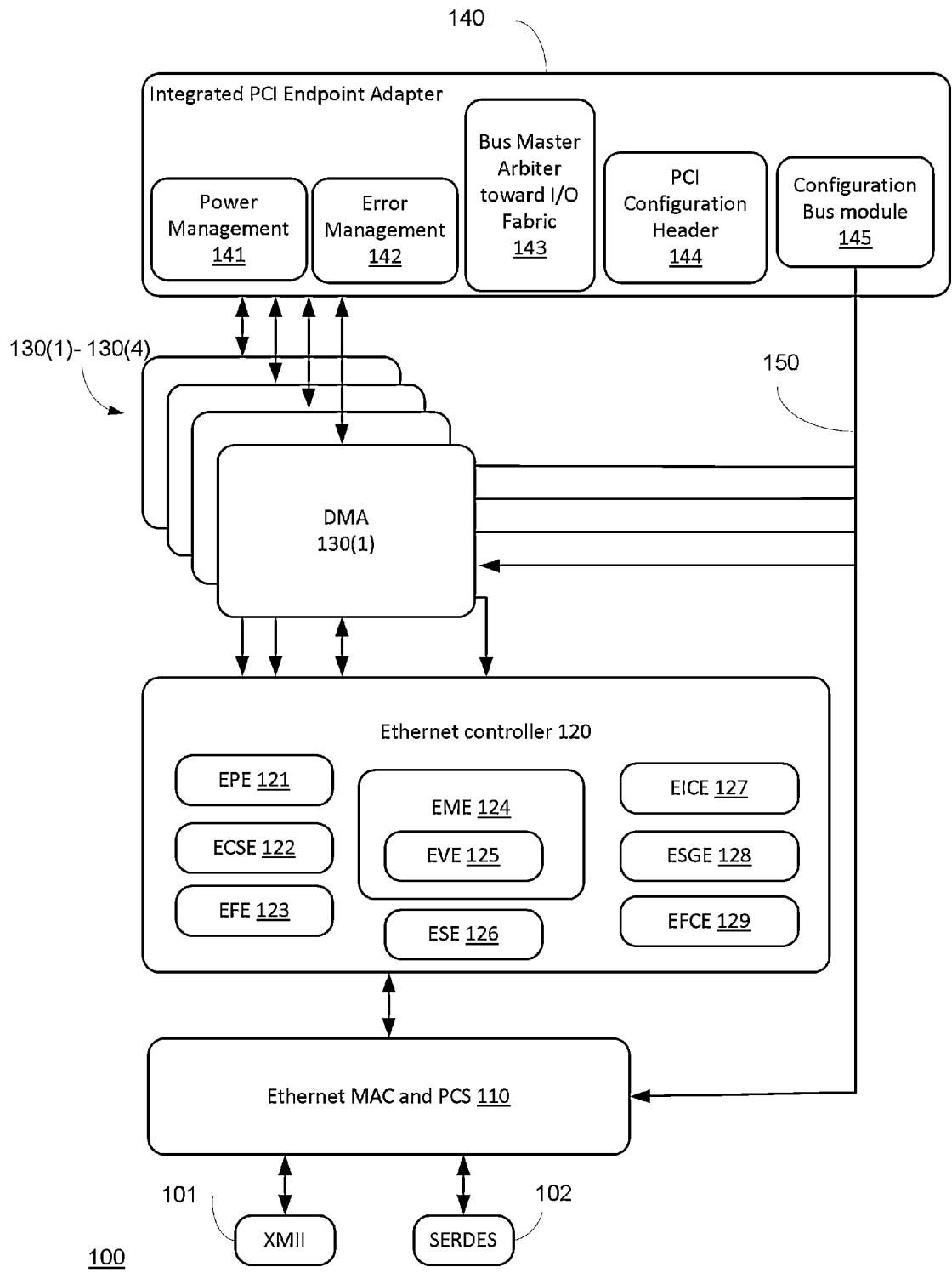
FIG. 1 illustrates a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

MAC stands for media access control.
DMA stands for direct access memory.
PCS stands for
PCI stands for Peripheral Component Interconnect.
PMA stands for program memory area.
TX stands for transmit.
RX stands for receive.
TCP stands for transmission control protocol.
UDP stands for user datagram protocol.
IPv4 stands for Internet Protocol version 4.
CPU stands for central processing unit.
ALU stands for algorithmic processing unit.
OS stands for operating system.
VLAN stands for virtual local access network.

There is provided a system that may include a parser that is arranged to handle the dynamic network environment, that is flexible to support multi protocols simultaneously, that is configurable to support any known, proprietary and future protocols. The parser can support multi-layer encapsulation without increasing the complexity of the implementation. The parser may be modular and may support any line rate (from 1 Gbps to hundreds of Gbps), can provide efficient software offload, have a small silicon area and consume low energy.

The parser may include multiple configurable parser engines and concatenating modules. The parser may be arranged to perform deeper packet parsing, may increase the number of supported protocols and may keep line rate performance. The parser may include a distribution module for performing load balancing between the configurable parsing engines and enable scaling of the supported data rate.

Each configurable parsing engine may be configurable and enable multi-protocol support. Each configurable parsing engine may be fed with an offset (from initial phase or previous parsing engine), may check a selected portion of an information unit (a protocol payload) in a configurable offset, preform any arithmetic logic on the protocol payload to determine next protocol, checks for header length in a configurable offset, perform any processing (such as arithmetic logic) on the header length to determine the next offset, update a result vector with different header fields, can select which field (configurable offset and length) to store in a result vector to be used by next engine or another module, update control information and statistics to be used by the next engine or another module.

The result vector can hold information such as addresses, priority, etc.

The results vector can hold command for the next parser or a next module (for example a forwarding engine).

The parser may be included in a communication controller such as an Ethernet Controller that may be a high-performance unit responsible for connecting host processor and its memory with the Ethernet world.

FIG. 1 illustrates a system 100 that includes an Ethernet controller 120 according to an embodiment of the invention.

The system 100 may include four major blocks: (a) An Ethernet MAC 110, with integrated PCS and PMA layer in most cases (Ethernet MAC and PCS); (b) An Ethernet controller 120 that processes Ethernet packets, and offloads the host to boost system performance; (c) A bus-master scatter-gather DMAs 130(1)-130(4) based on the common Universal DMA (UDMA) architecture, The UDMA performs rate shaping and scheduling functions as well, and (d) A PCI Integrated End Point (IEP) unit interface 140 to the internal I/O fabric.

FIG. 1 also shows XMII 101 and SERDES 102 modules as being coupled to Ethernet MAC 110.

The IEP unit interface 140 is shown as including a power management module 141, an error management module 142, a bus master arbiter towards I/O fabric module 143, a PCI configuration header module 144 and a configuration but module 145. The configuration bus module 145 is connected to a configuration bus 150 that is connected to the DMAs 103(1)-130(4) and to the Ethernet MAC 110.

Figure 2A:
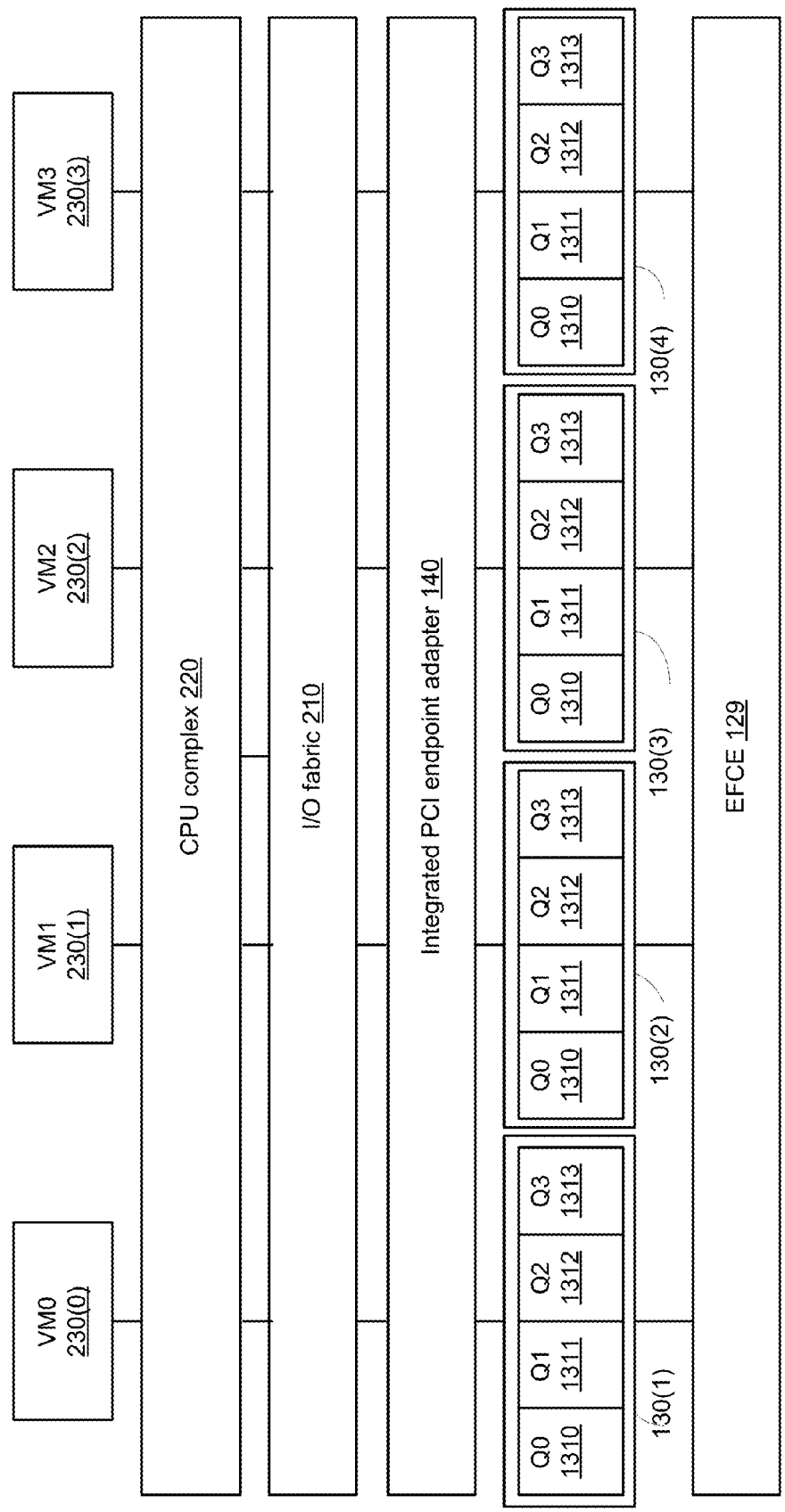
FIG. 2A illustrate various Direct Memory Access Controllers (DMAs) of the system of FIG. 1 and their environments according to various embodiments of the invention.

FIG. 2A illustrates part of the connectivity, according to an embodiment of the invention, between the DMAs 130(1)-130(4) and the integrated PCI endpoint adaptor 140 to I/O fabric 210 and to a CPU complex 220 that hosts multiple virtual machines VM0-VM3 230(0)-230(3).

Figure 2B:
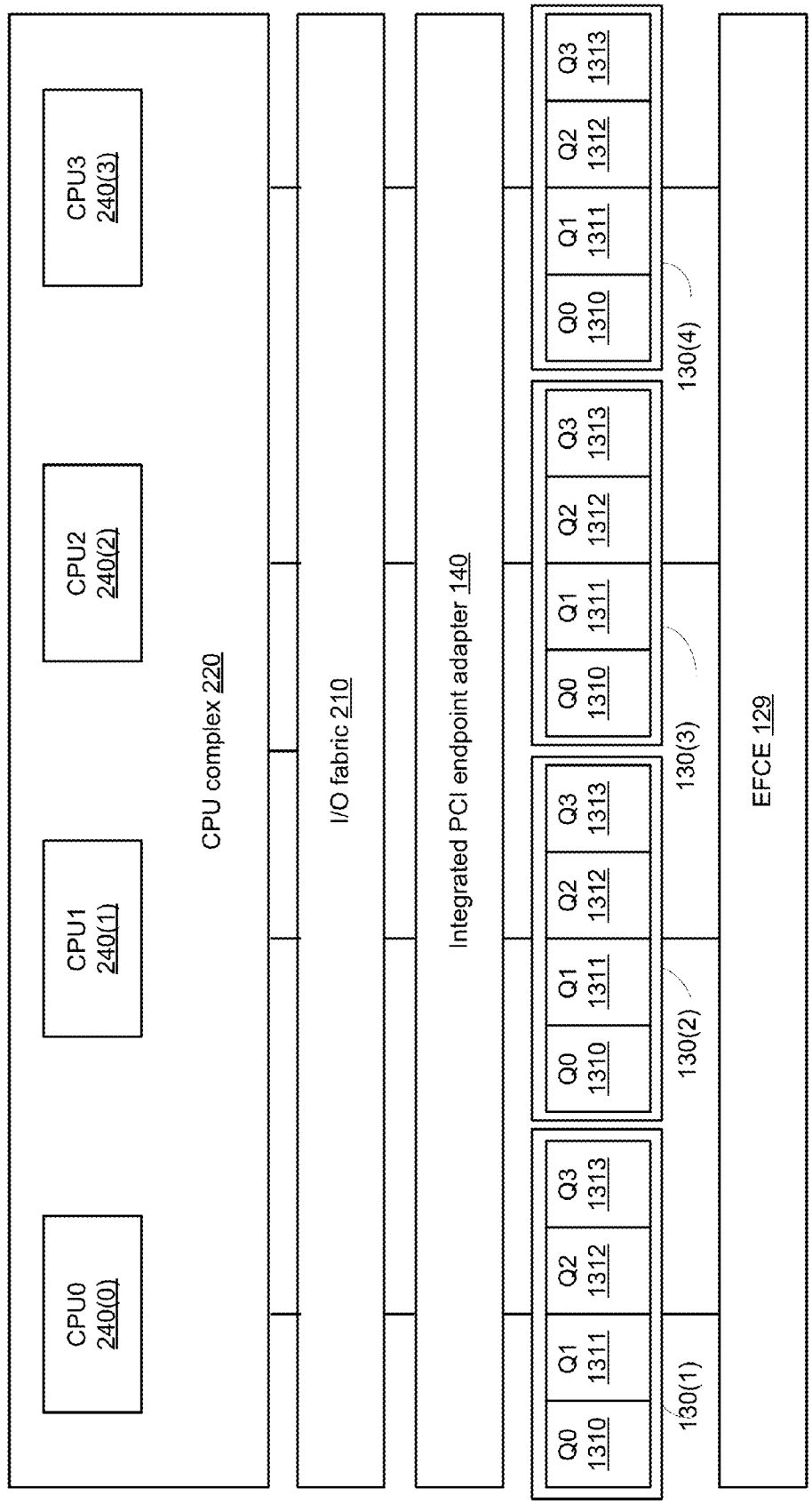
FIG. 2B illustrates part of a connectivity, according to an embodiment of the invention, between DMAs, and integrated PCI endpoint adaptor, a fabric and a CPU complex.

FIG. 2B illustrates part of the connectivity, according to an embodiment of the invention, between the DMAs 130(1)-130(4) and the integrated PCI endpoint adaptor 140 to I/O fabric 210 and to a CPU complex 220 that includes multiple CPUs 240(0)-240(3).

In FIGS. 2A-2B each DMA is illustrates as including four queues 1310-1313, 1320-1323, 1330-1333 and 1340-1343 respectively. A selection of a destination (CPU or virtual machine) may select which queue will be used to store information units destined to the destination.

Referring back to FIG. 1, the Ethernet controller performs various packet-processing functions to offload the host processor, improve performance, and enforce security.

The HOST processor can be on chip CPU (CPU complex, 220) or can be external CPU which is connected to the chip through (for example) PCIe interface, so I think we can change 'host processor' to 'CPU' and add another sentence that says that the CPU can be on chip CPU or external CPU There are two versions of the Ethernet controllers: Standard Ethernet controller and Advanced Ethernet controller.

Standard Ethernet Controller

The Standard Ethernet controller provides common Ethernet functionality in common usage cases, specifically for home, consumer, small to medium business, and development environments.

It supports the functionality described in the following subsections, at all speeds.

Ethernet Checksum Engine (ECSE) 122

The Ethernet Checksum Engine (ECSE) offloads the host by calculating the IPv4 header checksum and the TCP/UDP checksum.

In the TX direction, The IPv4 and TCP/UDP checksum is inserted to the transmitted packet in a pre-configured offsets based on the parsing information.

Note that when the software sends consecutive packets with the same characteristics, the offsets and control information from the first packet can be stored and used for the next packets.

In the RX direction, the parsing engine provides all the information required for checksum calculation (detected protocols and offsets), the checksum engine calculate the IPv4 and TCP/UDP checksum and compare it to the received value, the result is forwarded to the software in the completion descriptor.

When tunneling is used, the checksum engine can perform the checksum offload for outer packet or the inner packet.

Ethernet Forwarding Engine (EFE) 123

The Ethernet forwarding engine includes a filtering engine and a flow steering engine.

The Ethernet Filtering Engine performs basic MAC Address and VLAN filtering, permitting only desired traffic to hit host memory. It is responsible for MAC/VLAN spoofing prevention.

Ethernet Flow steering Engine (EFSE)—For packets received from the Physical Ethernet MAC in a virtualized environment, the EFSE decides to which virtual machine/OS this packet should go, including multicasting the packet to multiple virtual machines, or sending it to the hypervisor only. In AMP environment the flow steering engine decides to which CPU each packet should go.

The flow steering engine can also perform load balancing to assist performance of a single operation system or single virtual machine that runs on multiple processors (or threads). The ELBE distributes incoming packets from the physical Ethernet ports to the different DMAs, based on pre-defined criteria or based on a load-balancing hash. This distributes traffic loads to multiple processors based on hash or desired affinity.

The EFSE also classifies the packets to traffic classes and Quality of Service (QoS), enabling appropriate QoS treatment.

The output of the parsing engine is used to determine the packet priority, both L2 (VLAN priority) and L3 (IP DSCP/TOS) can be used to determine the packet priority and the target queue The output of the forwarding engine is the target DMA and target queue.

Ethernet Modification Engine (EME) 124 may include an Ethernet VLAN Engine (EVE) 125.

The EVE 125 performs VLAN header modification, generation, and removal.

The VLAN modification command is forwarded to the modification engine in the metadata, the same command can be used to consecutive packets transmitted from the same queue, this feature enables the software to determine one VLAN modification configuration for a specific flow, send it once through a metadata descriptor and the hardware will implement the same command for all consecutive packets without any software load.

Ethernet Switching Engine (ESE) 126

ESE functionality is required only in a virtualized environment or in an asymmetric multi-processor (AMP) environment. The purpose of the ESE is to provide packet switching between the various Virtual Machines or Operating systems running on the same chip, and the Physical Ethernet MAC.

For packets received from the Physical Ethernet MAC, the ESE decides to which virtual machine/OS this packet should go, including multicasting the packet to multiple virtual machines, or sending it to the hypervisor only.

For an outbound packet, i.e., a packet being transmitted by a given virtual machine or operating system, the ESE decides whether to forward the packet to the physical Ethernet MAC, to another Virtual Machine, or to multicast it to several or all of them.

The ESE and EFSE functionalities are different and complementary: ESE distributes to different operating systems or virtual machines, while EFSE distributes traffic to multiple processors running the same operating system or virtual machine.

Ethernet Inline Cryptography Processor (EICE) 127

The Ethernet Inline Cryptography Processor (EICE) performs Ethernet traffic encryption and decryption, to ensure confidentiality and/or authenticity of the packets. It supports both 802.1AE as well as CAPWAP crypto frameworks.

Traditionally this function was not performed or was performed by the host processor or a co-processor inside the device, which is not optimal from the performance aspect, due to software involvement, as well as multiple memory copies, and the fact that it wastes power.

The inline cryptographic implementation provides the ideal performance and power saving.

Ethernet Segmentation Engine (ESGE) 128

The Ethernet controller performs packet segmentation to offload the software driver. The segmentation process is configurable; the offsets of the L2 and L3 headers and the protocol information are forwarded through the metadata.

The software driver may be running on the CPU, in FIG. 2 it can be the CPU complex (220) or the VM—virtual machines (230) which are running on the CPUs and also has their own software drivers.

The Segmentation engine stores the original packet header, it is used to build new header with updated fields for each transmitted packet, the engine builds new packet by combining the new generated header and the transmitted data based on the selected Max Segment Size MSS.

The protocols indication inside the descriptor (protocol index) indicates the L3/4 protocol of the packet and determines the type of segmentation.

The Segmentation engine may perform packet segmentation to offload software when transmitting long packets or short packets.

The segmentation engine stores the original header and generates new header for each transmitted packet, the original packet data is segmented to multiple packets based on the configured Maximum Segment Size (MSS). The new headers and segmented data are packetized to generate new packets for transmission.

The Segmented packets may go through the same data path and engines used for standard packets (e.g. checksum, modification etc.).

The segmentation engine is (a) programmable and that will handle the dynamic network environment, (b) flexible to support multi protocols simultaneously, (c) configurable to support any known, proprietary and future protocols, (d) capable of supporting multi-layer encapsulation without increasing the complexity of the implementation, (e) provides efficient software offload, requires small silicon area and has a low power consumption. This achieved by using configurable opcodes which can add/remove/replace/increment the data of the packet header with configurable offsets. So based on the packet information and the L2/3/4 protocols, a different sets of commands is selected to modify the packet header and perform the segmentation.

Figure 6:
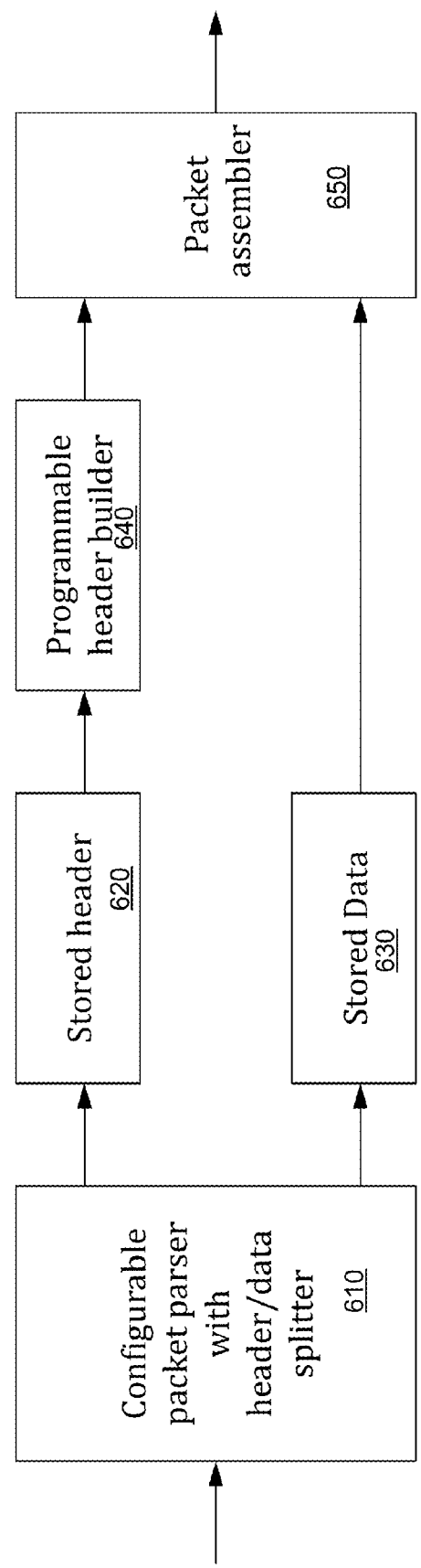
FIG. 6 illustrates a Ethernet Segmentation Engine according to an embodiment of the invention.

FIG. 6 illustrates ESGE 129 according to an embodiment of the invention. It includes (A) a configurable splitter engine 610 that separates the header form the data (this configurable splitting engine can be included in EPE 121 ore receiving information about the locations of headers from EPE 121), (b) a programmable header builder 640 that builds new headers for the segmented packet, (c) memory modules 620 and 630 for storing headers and data respectively, and (d) generic packet assembler 650 that combines the new header and data into a new valid packet.

The programmable header builder 640 may perform a set of generic operations to support any protocol. It detects the packet protocol and split the header information and the payload information. It may receive or generate configurable information per protocol to support for multiple protocol with different offsets, lengths and alignments simultaneously The programmable header builder 640 may take a generic header (with any format, offset and length) and builds a new header using a set of configurable rules. The configurable rules are set of commands that can be used to generate new fields and insert them into the packet header, replace existing fields and delete existing fields.

Each command may support configurable offset and length. Each command can be configured to use existing packet data, new packet data, counters, and stored register information The set of commands includes both arithmetic and logic commands.

Any header can be build using multiple sets of commands.

Using different configuration of the command sets and their variables, any protocol can be supported and any header can be build.

This enable supports for:

a. Multiple protocols simultaneously on the same system.
b. Standard and proprietary protocols.
c. Protocol encapsulation.
d. Support for future protocols.

The packet assembler 650 may be arranged to read the new header and remaining data to generate new valid packet.

Figure 7:
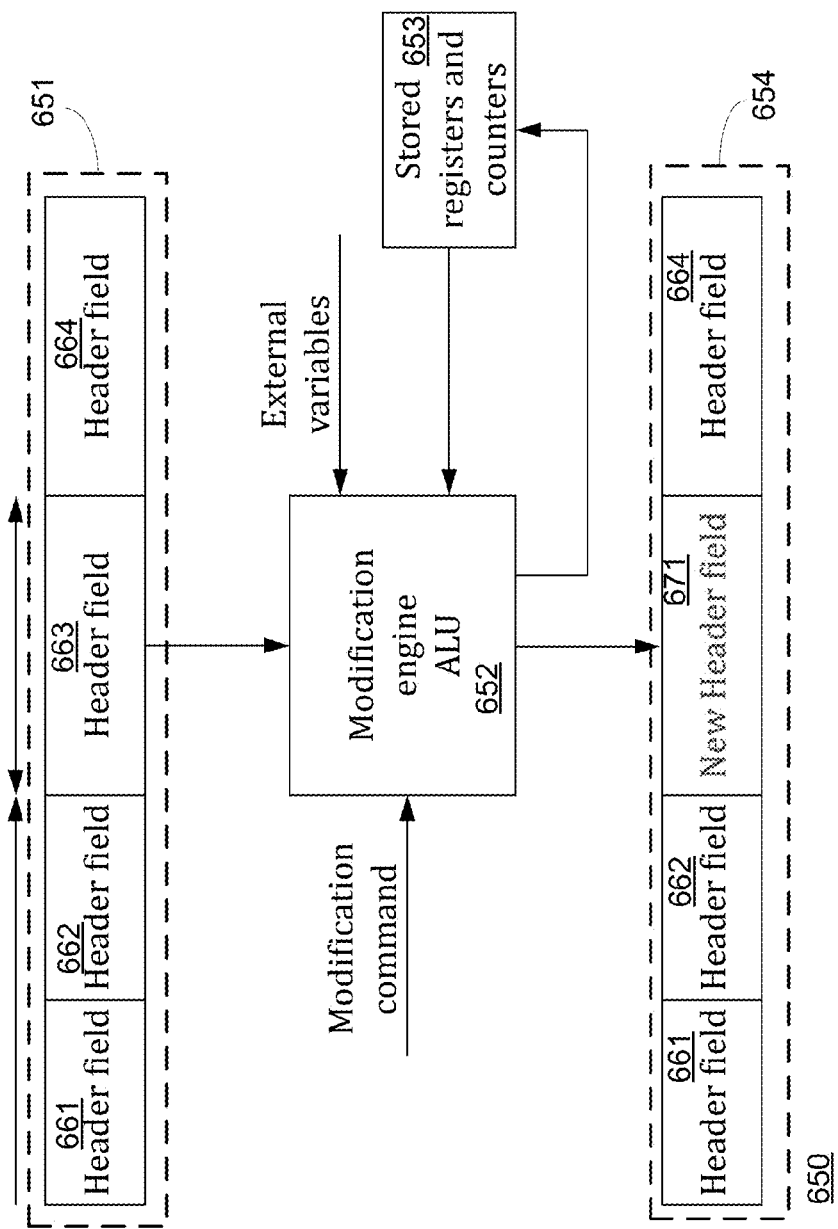
FIG. 7 illustrates programmable header builder according to an embodiment of the invention.

FIG. 7 illustrates programmable header builder 640 according to an embodiment of the invention.

Programmable header builder 640 includes: (a) buffer 651 for storing the current headers of an information unit (such as a sequence of headers 661, 662, 663 and 664), (b) buffer 654 for storing the new headers of the information unit (sequence of headers 661, 662, 671 and 664—as header 671 replaced header 663, (c) modification engine ALU 652 and (d) stored registers and counters 653.

FIG. 8 illustrates various examples of frames that were modified by the programmable header builder 640.

Ethernet Flow Control Engine (EFCE) 129

Ethernet defined flow control to support drop-less links. A later standard for supporting Data Center Ethernet (DCE) added support for priority-based flow control (PFC) To support drop-less Ethernet on certain traffic classes only, and enable native FC-o-Ethernet, RDMA-over-Ethernet (RoCE) etc., the Ethernet standards committee added support for priority-flow control, enabling flow control on selected traffic classes, while allowing normal behavior without flow control on traditional Ethernet traffic.

Priority flow control is supported in advanced mode.

Received PFC packet stops transmission for specific queues, the mapping between the priority in the PFC packet and the DMA queues is configurable.

The flow control engine works in both Tx and Rx directions and coordinates between queue status and queue pause in the UDMA, and generation and reception of flow control packets in the Ethernet MAC.

The Ethernet Flow Steering engine selects the target UDMA and target queue to which to forward the received Ethernet packet.

The Target UDMA can be connected to different host or different virtual machines.

The Flow Steering engine uses the output from the parsing engine for the forwarding decisions. It uses information for both the outer and inner packet when tunneling is detected.

Figure 9:
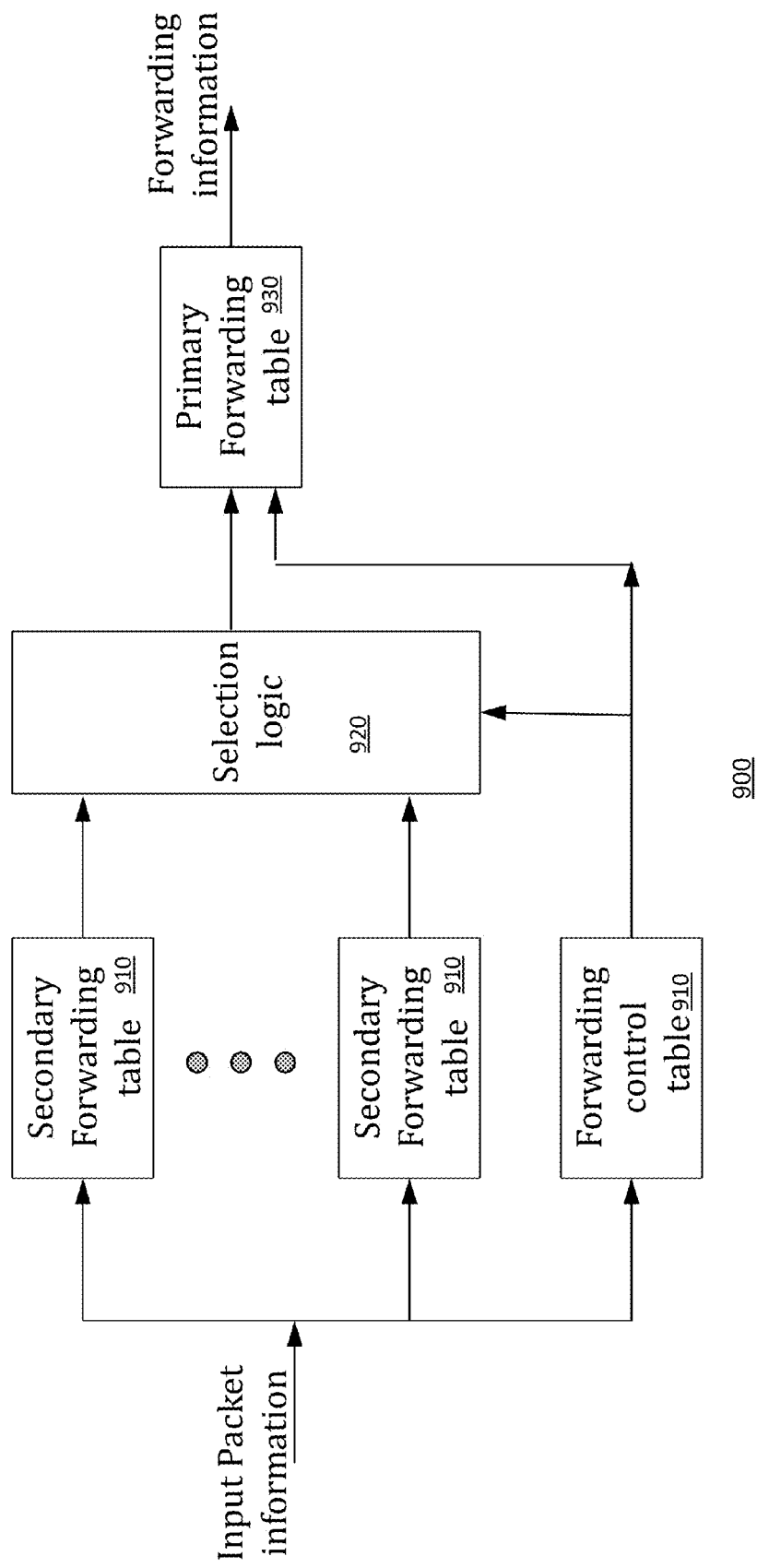
FIG. 9 illustrates an Ethernet flow steering engine according to an embodiment of the invention.

FIG. 9 illustrates Ethernet Flow Steering engine 900 according to an embodiment of the invention.

The Flow steering engine receives the parser information and use it to select where to forward the packet based on the parsing information. It selects the target CPU/OS/Queue. The forwarding control tables (910) gets the protocol information (From the parser) as an input address and the output of these tables are sets of control signals which controls which are used by the selection logic (920) as input to the selection MUXs to select the target CPU and target queue for each packet.

The output of the control tables (910) can also be used for other acceleration engines such as CRC offload to indicate how to process the received packet.

Tx Operation

When the host has an Ethernet packet for transmission it prepares a list of M2S Descriptors and writes them to the selected Tx descriptor ring of the M2S UDMA. Each packet can be represented by one or more descriptors. The packet can include two types of descriptors: buffer descriptors and metadata descriptors. The buffer descriptor includes control information, metadata and a 64-bit pointer to the data buffer. The metadata descriptor includes control information and metadata that can be used for processing the packet.

The UDMA forwards the metadata and the packet data to the Ethernet controller through the stream interface.

The Ethernet controller performs the following operations in the Tx data path.

Tx packet parsing is based on descriptor information.

The software driver writes the parsing parameters and forwarding information in the metadata of the first buffer descriptor (first buffer descriptor, Word_1_metadata[31:0]).

An additional metadata descriptor can be used to write additional parsing and forwarding information for a packet. When the metadata section in the buffer descriptor is not sufficient, the driver prepares these metadata descriptors before the buffer descriptors.

The Ethernet controller stores the last Tx parsing information for each queue (from each UDMA). This information can be used for the following packets that don't include metadata descriptors. (This mode of operation reduces the number of descriptors used when the same metadata is used for consecutive packets).

TX Parsing Engine

The TX Parsing engine receives the metadata information forwarded from the buffer and metadata descriptors, It has a cache memory per TX Queue (for example the queues of FIGS. 2A and 2B) to store the information received from the application in the metadata, the software can modify this memory through register file access or using the M2S metadata descriptors.

This feature can offload the software when transmitting multiple packets in the same queue with the same characteristics, in this case, the software only need to initialize this memory for the first transmitted packet (using metadata descriptor) and the same commands and offsets will be used for the consecutive packets which will only include buffer descriptors.

Ethernet Parsing Engine (EPE) 121

The Ethernet Parsing Engine (EPE) performs packet parsing to detect packet type, detect all headers (and their offsets) and forward all parsing information to the following processors.

RX Parser

The Parsing engine performs packet parsing to detect the protocol fields and information of the packet. The parser is configurable and can detect up to 32 pre-configured protocols.

The parser engine implements multistage parsing engines to detect tunneling protocol. When tunneling is detected, the information of the outer packet is stored and the next stage of parsing is activated, the next stage parse the inner packet as if it was a standalone packet and can detect any preconfigured protocol.

The parsing information for both outer and inner header is stored and forwarded to the flow steering engine to determine the target queue/host and is forwarded to the software driver through the S2M completion metadata.

The parsing engine starts with an initial configuration and search for configurable data at a configurable offset in the packet. The data shift register is loaded until the selected offset is reached and then the selected data is compared to the preconfigured data. When a match is detected, the command output for this match is used for further processing. The command data includes information about the detected protocol and commands for the next step.

Once a protocol has been detected with end_of_parsing asserted in the command data, the parsing engine completes its operation and forwards the parsed data to the next engine.

The software driver performs the configuration of the compare logic and command output to detect L2/3/4 protocol detection and generate the output parsing information.

Figure 3:
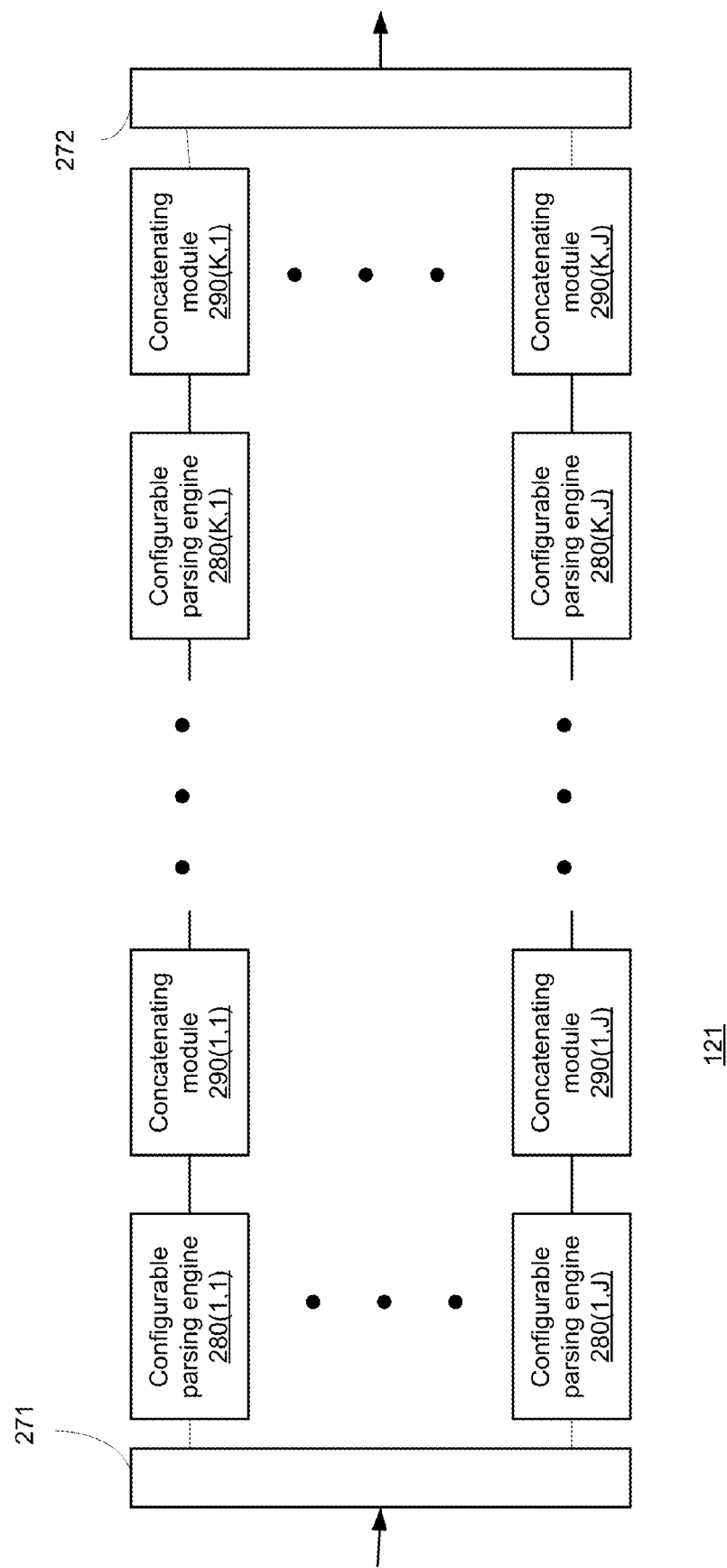
FIG. 3 illustrates an Ethernet Parsing Engine according to an embodiment of the invention.

FIG. 3 illustrates EPE 121 according to an embodiment of the invention.

EPE 121 includes distribution module 271, multiple interleaved sequences of configurable parsing engines and concatenating modules and an aggregation module 272 that collects the output from the multiple interleaved sequences.

FIG. 3 illustrates J interleaved sequences, each includes K concatenating modules and K configurable parsing engines. J and K are positive integers.

The notation 280($k,j$) refers to the k'th configurable parsing engine of the j'th interleaved sequence (k ranges between 1 and K while j ranges between 1 and J). FIG. 3 illustrates configurable parsing engines 280(1,1)-280(K,J).

The notation 290($k,j$) refers to the k'th concatenating module of the j'th interleaved sequence (k ranges between 1 and K while j ranges between 1 and J). FIG. 3 illustrates concatenating module 290(1,1)-290(K,J).

The distribution module may be arranged to distribute information units between the multiple interleaved sequences of configurable parsing engines and concatenating modules. It may apply load balancing or other considerations.

Different portions of an information unit are processed by different configurable parsing engines of a certain interleaved sequence.

At least one configurable parsing engine is arranged to (a) process of a portion of the information unit in response to a previous processing result provided from a previous configurable parting engine; and to (b) generate a current processing result to be used by a next configurable parsing engine. The current processing result comprises a command directed to the next configurable parsing engine. A current processing result may be used by anther module of a communication controller. The current processing result may be indicative of an offset to a header length indicator included in a portion of the information unit to be processed by the next configurable parsing engine.

Figure 4:
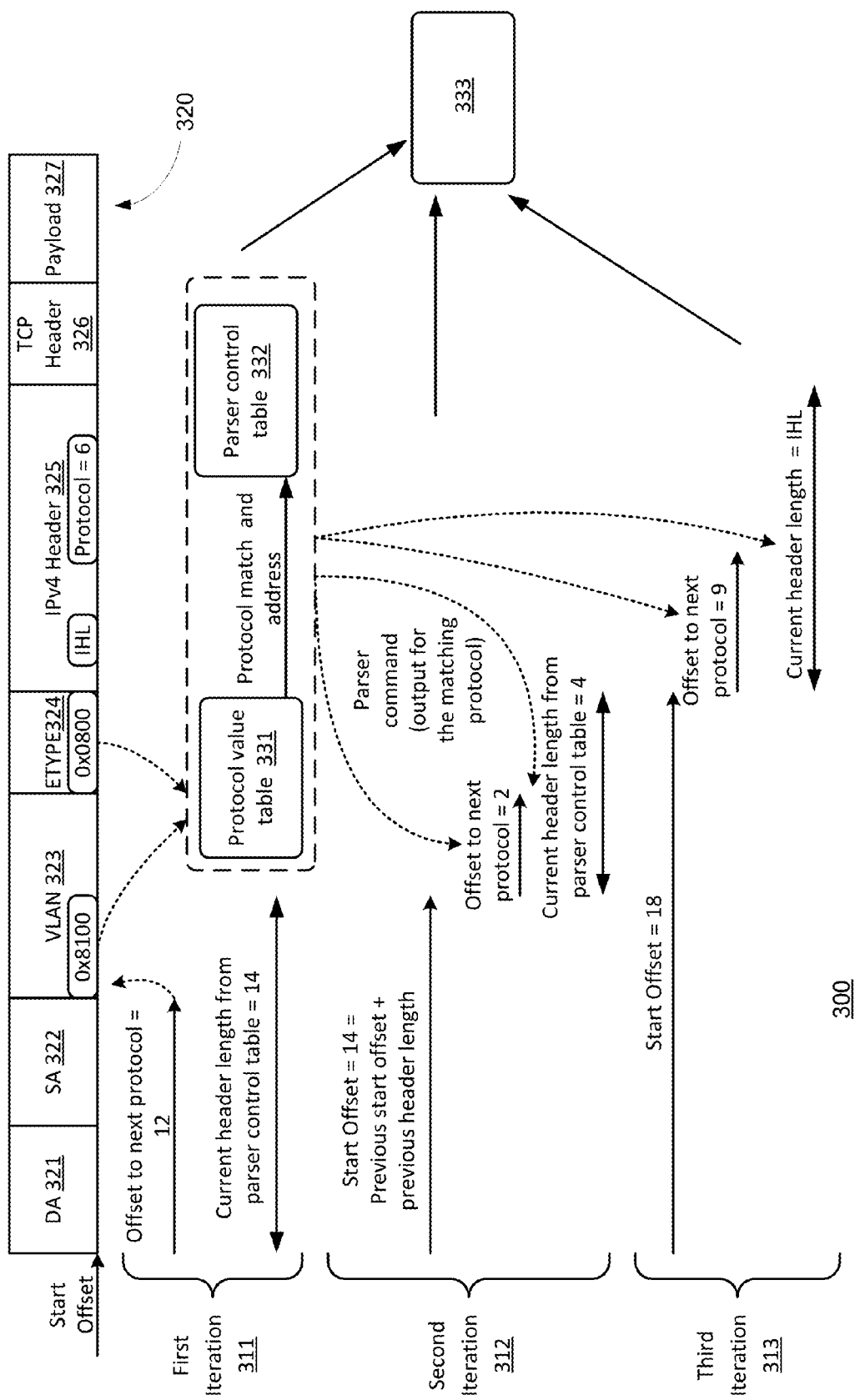
FIG. 4 provides an example of a processing operation of an information unit that is a TCP/IP frame that is processed by multiple configurable parsing engines.

FIG. 4 provides an example of a processing operation of an information unit that is a TCP/IP frame 320 that is processed by multiple configurable parsing engines.

Each configurable parsing engine may be arranged to be configured by receiving information unit portion limit metadata indicative of a location of an information unit portion to be processed by the configurable parsing engine.

Each configurable parsing engine may be arranged to be configured by receiving processing metadata indicative of a manner in which the information unit portion should be processed by the configurable parsing engine. The system according to claim 1, wherein different configurable parsing engines are configured to process information unit portions that relate to different protocol suit levels.

The TX Direction

All the parsing information is received from the descriptor or pre-configured per queue.

The controllers holds a per queue database with all the parsing information, this information can be dynamically updated by the software driver using metadata descriptor at the head of the transmitted packet or configured using register access.

The controller can also store the metadata information from one packet to be used for following packets, this feature can be used by the software driver when it send multiple packets with the same characteristics to reduce CPU load and memory access load.

In the Rx direction,

The parsing is performed by the hardware, based on received data, pre-configured detected protocol values and offsets.

The parsing engine is preconfigured, it detects the received protocols and write them to the next parsing engine, the detected protocols are also written into the completion descriptor and can be used by the software to detect the L3 and L4 protocols and offsets without doing additional memory access for parsing the packet.

The protocols are forwarded using protocol_index number, which is configured for each detected protocol.

The protocol_index can have the following values:

TABLE 1

Table 1. Protocol_index example

| Protocol_index value | Detected protocol | Comments |
| --- | --- | --- |
| 0 | Not Used | Protocol not detected |
| 1 | mac_802_3 | Standard 802.3 packet |
| 2 | mac_802_3_ms_8 | Standard 802.3 packet, with MACSEC (8 bytes header) |
| 3 | mac_802_3_ms_16 | Standard 802.3 packet, with MACSEC (16 bytes header) |
| 4 | vlan_1_1 | First VLAN detected (one type, for example 0x8100) |
| 5 | vlan_1_2 | First VLAN detected (one type, for example 0x9100) |
| 6 | vlan_2_1 | Second VLAN detected (one type, for example 0x8100) |
| 7 | vlan_2_2 | Second VLAN detected (one type, for example 0x9100) |
| 8 | ipv4_frag_check | Internal, IPv4 detected |
| 9 | ipv4_no_frag | IPv4 without fragmentation |
| 10 | ipv4_frag | IPv4 with fragmentation |
| 11 | ipv6 | IPv6 |
| 12 | TCP | TCP |
| 13 | UDP | |
| 14 | GRE | GRE |
| 15 | IPv6_over_IPv4 | IPv6 over IPv4 detected |
| 16 | LLC | |
| 31 | not detected | Protocol not detected |

Table 1

The Ethernet parsing Engine (EPE) performs receive packet parsing to packet type, detect all headers (and their offsets) and forward all parsing information to the next engines in the Ethernet controller pipeline.

The detected L3 and L4 protocols are also written into the Rx Completion Descriptor, and can be used by the software to detect the L3 and L4 protocols and offsets without doing additional memory access for parsing the packet. The EPE can be configured to recognize proprietary protocols that typical Ethernet Switches or FPGA would add to the packet.

The Parser database includes 3 sets of memory structures (see FIG. 4):

a. Compare logic array 331 an array of values, masks and commands. each line is used to detect a preconfigured protocol.

b. Parser control table 332—a table which includes commands how to process the detected protocol and how to generate the inputs for the next iteration.

c. Parse result vector 333—stores all the parsed information that was saved during the parsing process The parser works in iterative mode, each iteration performs the following operations:

A 16-bit protocol field is selected from the packet (the offset to this field is the result of the previous iteration).

The protocol field along with other result fields from the previous iteration are used as an input to the compare logic array.

The output of the compare logic array is the matching line number which is used as an address to read the parsing command from the parse control table Note that if there is no match, the last line is saved as a default for undetected protocols.

The data read from the parse control table is used to process the header, save parsing information to the parse result vector and generate inputs for the next parsing iteration Note—the parsing command from the parse control table includes an "end of parse" bit which indicates the end of the parsing process.

The output of the parser is a parse result vector which includes all the parsing information (for example, MAC DA, MAC SA, VLAN tag, IP-SIP, IP-DIP, L3 protocol index, L4 protocol index), this information is used by the forwarding engine and some of the fields are forwarded to the software driver in the metadata fields of the descriptor.

Referring to FIG. 4—an information unit 320 is processed by three configurable parsing engines during first, second and third iterations 311, 312 and 313. The information unit includes the following fields: DA 321, SA 322, VLAN 323, ETYPE 324, IPv4 Header 325, TCP Header 326 and payload 327.

DA 321 and SA 322 are detected during processing executed during the first iteration and are sent to the parse result vector 333. The first iteration includes determining an offset (Offset to the next protocol=12) to the next protocol (a part of the current processing result) that is fed (by a first concatenating module) a next (second) configurable parsing engine. The first iteration may also include retrieving a current header length from the parser control table 332.

VLAN information is detected during processing executed during the second iteration and it is sent to the parse result vector 333. The second iteration includes receiving the offset and/or current head length calculated during the first iteration and processing the VLAN information. The second iteration also includes determining an offset (Offset to the next protocol=2) to the next protocol (a part of the current processing result of the second iteration) that is fed (by a second concatenating module) a next (third) configurable parsing engine. The second iteration may also include retrieving a current header length from the parser control table 332.

IPv4 header 325 is detected during processing executed during the third iteration and it is sent to the parse result vector 333. The third iteration includes receiving the offset and/or current head length calculated during the second iteration and processing the PIv4 header 325. The third iteration also includes determining an offset (Offset to the next protocol=9) to the next protocol (a part of the current processing result of the third iteration) that is fed (by a third concatenating module) a next (fourth) configurable parsing engine. The third iteration may also include retrieving a current header length from the parser control table 332.

Figure 5:
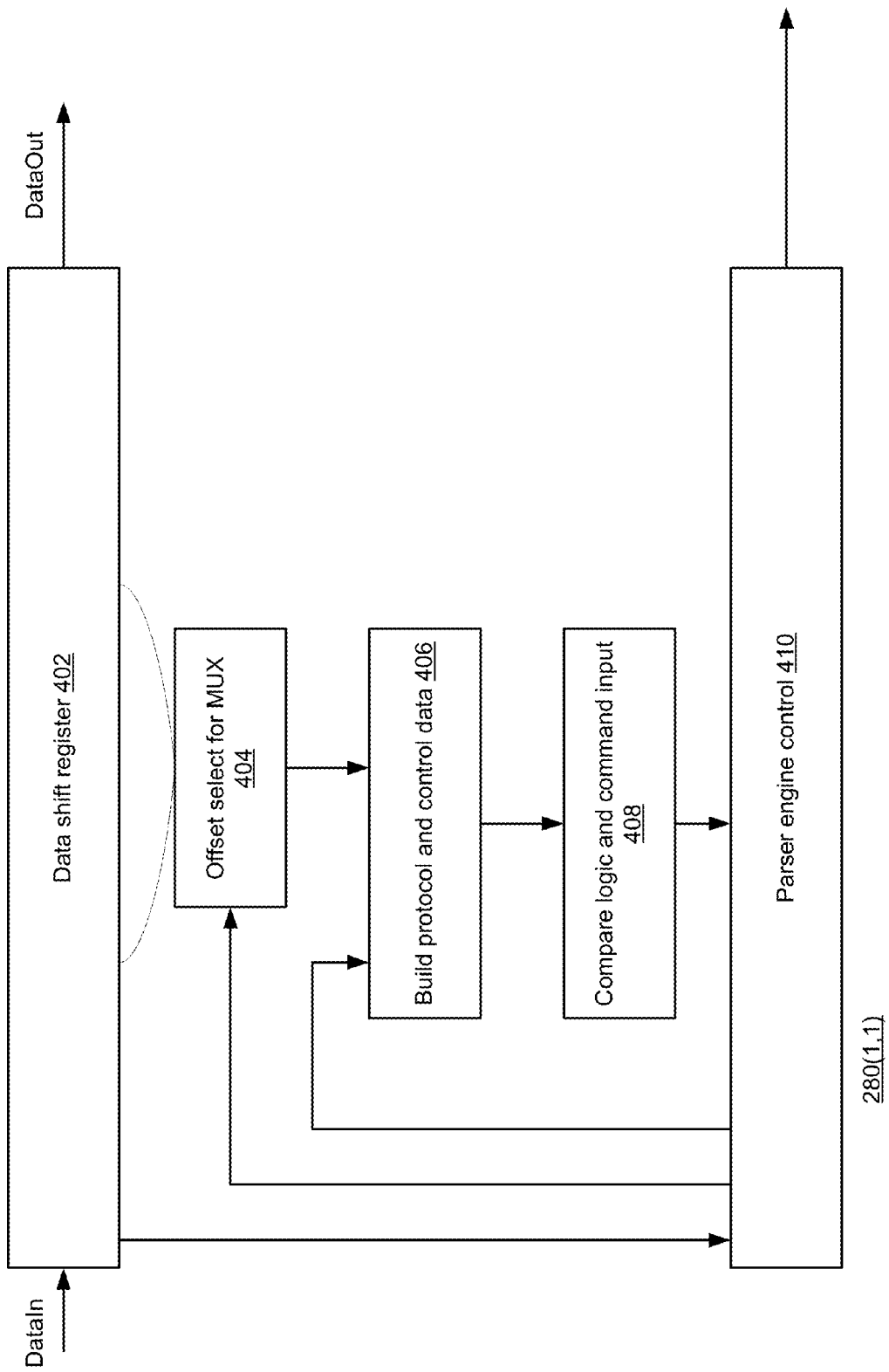
FIG. 5 illustrates a configurable parsing engine according to an embodiment of the invention.

FIG. 5 illustrates a configurable parsing engine 280(1,1) according to an embodiment of the invention.

The configurable parsing engine 280(1,1) includes parser engine control module 410, compare logic and command input module 408, built protocol and control data module 406, offset select for MUX 404 and data shift register 420.

The data memory (402) stores the packet information (FIG. 4, 320), the Offset select MUX (404) selects the data from the current offset in the packet payload (320) and build the input information (406) which include protocol data and control information to the compare logic and (408) which includes the protocol value table (331) and parse control table (332), the output from this tables is forwarded to the parse engine control (410) which generates the information for the next iterations and the output for the next engine and the result vector (333)

In the transmit (Tx) direction, all the parsing information is coming from the Tx Descriptor or pre-configured per queue.

The Ethernet controller holds a per-queue database with all the parsing information: this information can be dynamically overridden and/or updated by the software driver using metadata Descriptor at the head of the transmitted packet or configured using register access.

The Ethernet controller can also store the metadata information from one transmitted packet to be used for following packets, this feature can be used by the software driver when it is transmitting multiple packets with the same characteristics to reduce CPU load and memory access.

In the advanced Ethernet controller, tunnel packets can be detected and both outer and inner header can be parsed.

The inner packet parsing is performed by a second parsing engine which start header parsing where the first parser detected a tunneling protocol, the first parser forward the initial offset and protocol which is used for the first iteration of the second parser. The first parsing engine can be a configurable parsing engine and the second parsing engine can be a configurable parsing engine that follows it (as illustrated, for example, in FIG. 3).

The parsing engine performs packet parsing to detect the protocol fields and information of the packet. The parser is configurable and can detect up to 32 pre-configured protocols.

The parser engine implements multistage parsing engines to detect tunneling protocol. When tunneling is detected, the information of the outer packet is stored and the next stage of parsing is activated, the next stage parse the inner packet as if it was a standalone packet and can detect any preconfigured protocol.

The parsing information for both outer and inner header is stored and forwarded to the flow steering engine to determine the target queue/host and is forwarded to the software driver through the S2M completion metadata.

The parsing engine starts with an initial configuration and search for configurable data at a configurable offset in the packet. The data shift register is loaded until the selected offset is reached and then the selected data is compared to the preconfigured data. When a match is detected, the command output for this match is used for further processing. The command data includes information about the detected protocol and commands for the next step.

Once a protocol has been detected with end_of_parsing asserted in the command data, the parsing engine completes its operation and forwards the parsed data to the next engine, the number of iteration is configurable and can't exceed 32 iterations. The software driver performs the configuration of the compare logic and command output to detect L2/3/4 protocol detection and generate the output parsing information using the XXX API and YYY data structuring.

TABLE 2

| Compare logic array | | |
|---|---|---|
| Name | Size [bits] | Description |
| Valid | 1 | Indicates that this line is valid and can be sued for comparison |
| Data_1 | 16 | Data for logic operation |
| Mask_1 | 16 | Mask for logic operation |
| CMD_1 | 2 | Logic operation:<br>00—compare<br>01—<=<br>10—>=<br>11—ignore |
| Branch_id | 6 | Branch_id value for comparison,<br>Branch_id data is output from previous iteration.<br>The Branch_id can be used to create branches within the protocol detection process (for example to distinguish between first and second VLAN detection)<br>Branch_id field is saved between iteration and each iteration command can set/clear each bit separately |
| Branch_id_mask | 6 | Mask for the Branch_id comparison |
| Stage | 3 | Stage value for comparison,<br>Stage data is output from previous iteration.<br>The Stage can be used to mark the protocol layer that is currently being processed and to |

TABLE 2-continued

Compare logic array

| Name | Size [bits] | Description |
|---|---|---|
| | | distinguish between protocol values that are used in each layer. The stage field is set in each iteration. |
| Stage_mask | 3 | Mask for the Stage comparison |
| Output_protocol_index | 5 | This is the output of the compare logic, it is used as an address to the parse control table and used as an value to mark and signal protocols in the system. |

TABLE 3

Parse control table

| Name | Size [bits] | Units | Description |
|---|---|---|---|
| Next protocol command Indicates how to generate the 16-bits of protocol data for the next iteration comparison ||||
| Offset_to_next_protocol | 6 | bytes | Offset to the location of the next protocol data The offset is relative to the start location of the current header (for example, for IPv4, the offset is 7) |
| Next_protocol_avail | 1 | N/A | Indicates that the next protocol data is available in the current header (for example, for IPv4, the protocol is available, '1') |
| Default_next_protocol | 5 | N/A | Protocol index which is used as the next protocol index (for next iteration) in case that Next_protocol_avail = 0, and the next protocol is not available inside the current header |
| Prot_wr | 1 | N/A | Indicates if the protocol index should be written into the parse result vector (for example, for IPv4, this field is '1', the protocl index will be written as the L3 protocol index) |
| Prot_wr_pointer | 10 | bytes | Offset where to write the protocol index in the parse result vector |
| Select_prot_index | 1 | N/A | Selects which protocol index to write in the parse result vector. 0—next protocol index 1—current protocol index |
| Select_header_length | 1 | N/A | Selects which header length to write in the parse result vector. 0—next header length 1—current header length |
| Select_header_offset | 1 | N/A | Selects which header offset to write in the parse result vector. 0—next header offset 1—current header offset |
| Data command 1 Select data from the current parsed header and write it to the parse result vector (for example when parsing IPv4 header, write the source IP - SIP and destination IP - DIP into the parse result vector) ||||
| Offset_to_data_1 | 9 | bits | Offset to the location of the data that should be stored, The offset is relative to the start location of the current header (for example, for IPv4, to store the SIP and DIP, the offset is 12) |
| Data_size_1 | 9 | bits | Size of the field that should be written to the parse result vector (for example, for IPv4, to store the SIP and DIP, the size is 8) |
| Data_wr_1 | 1 | N/A | Indicates if the data should be written into the parser result vector |
| Data_wr_pointer_1 | 10 | bytes | Offset where to write the data in the parse result vector |

TABLE 3-continued

Parse control table

| Name | Size [bits] | Units | Description |
|---|---|---|---|
| Data command 2 Same as data command 1, allows to write additional field per header into the parse result vector | | | |
| Offset_to_data_2 | 9 | bits | Offset to the location of the data that should be stored, The offset is relative to the start location of the current header |
| Data_size_2 | 9 | bits | Size of the field that should be written to the parse result vector |
| Data_wr_2 | 1 | N/A | Indicates if the data should be written into the parser result vector |
| Data_wr_pointer_2 | 10 | bytes | Offset where to write the data in the parse result vector |
| Header length command Indicates how to calculate the length of the current header (used as an offset for the next header) The header length information can come from the current parsed header or the parse control table | | | |
| Offset_to_header_len | 8 | bits | Offset to the location of the header length in the current header, The offset is relative to the start location of the current header. (for example, for IPv4, the offset is 4) |
| Header length size | 5 | bits | Size of the header length field (for example, for IPv4, the size is 4) |
| Header_length_units | 3 | Bit shift | Indicates how to shift the header length value from the packet to get header length in units of bytes (for example, for IPv4, shift will be 2, multiplication of 4 because the IHL is in 32-bits words) |
| Header_length_cmd | 4 | N/A | Command how to calculate the header length: Bit [3]—reserved Bit [2]—indicates if the default header length from the parse control table should be added or not: 0—add default Bits [1:0]—header length selector: 00—use 0 01—use from packet data 10—use the packet header length data as address to header length table 1 11—use the packet header length data as address to header length table 2 (if bits [3:0] = '0000' than the default header length is used) (for example, for IPv4, the configuration is '0001') (for example, for VLAN, the configuration is '0000) |
| Default_header_length | 8 | bytes | Default header length value, Used based on the Header_length_cmd command field. (for example, for IPv4, the default header length is 0) (for example, for VLAN, the default header length is 4) |
| Parse control Commands and controls for the parser operation | | | |
| End_of_parsing | 1 | N/A | End of parsing indication 1—Indicates that this is the last header that should be parsed |
| Next_stage | 3 | N/A | Next_stage value for the next parsing iteration |
| Next_branch_id_set | 6 | N/A | Indicates how to change the Branch_id field for the next iteration The Branch_id field is saved between iteration and each iteration can change each bit of this field. The command is per bit 0—don't change this bit 1—change this bit to the value indicated in Next_branch_id_val |

TABLE 3-continued

Parse control table

| Name | Size [bits] | Units | Description |
|---|---|---|---|
| Next_branch_id_val | 6 | N/A | Indicated the value that should be used if the Next_branch_id_set is '1' (per bit) |
| Control_bit_set | 8 | N/A | Indicates how to change the control field. The control field is saved between iteration and each iteration can change each bit of this field. The command is per bit<br>0—don't change this bit<br>1—change this bit to the value indicated in Next_branch_id_val<br>At the end of the parsing, The control field (8 bits) is written into the result vector. (for example, A bit can be set in the control field to indicate if a VLAN is detected) |
| Control_bit_val | 8 | N/A | Indicated the value that should be used if the Control_bit_set is '1' (per bit) |
| Wr_header_length | 1 | N/A | Indicates if the header length should be written into the parse result vector (for example, for IPv4, this field is '1', the header length will be written as the L3_header_len) |
| Header_length_pointer | 10 | bytes | Offset where to write the header length in the parse result vector |
| Wr_header_offset | 1 | N/A | Indicates if the header offset should be written into the parse result vector (for example, for IPv4, this field is '1', the header offset will be written as the L3_offset) |
| Header_offset_pointer | 10 | bytes | Offset where to write the header offset in the parse result vector |
| Next_parse_en | 1 | N/A | Indicates if the next parser is enabled. This enables the tunnelled packet parsing, when tunnelling protocol is detected this bit enables the next parser operation to parse the inner header of the packet. Note: This is only applicable for advanced Ethernet controller |

TABLE 4

Parser output, Parse result vector

| Name | Width [bits] | Description |
|---|---|---|
| input_prot_index | 5 | Input for the next parsing engine. First protocol for detection. |
| input offset | 8 | Input for the next parsing engine. Offset for start of parsing. |
| input parse_en | 1 | Input for the next parsing engine. Enable parsing. |
| ctrl_bits | 8 | Control bits:<br>0 VLAN 1 exists<br>1 VLAN 2 exists<br>2 Tunnel detection IPv4<br>3 fragmentation<br>4 L4 found<br>5 Reserved<br>6 Reserved<br>7 Packet drop |
| p_l3_prot_index | 5 | L3 Protocol index |
| p_l4_prot_index | 5 | L4 Protocol index |
| p_da | 48 | MAC DA |
| p_sa | 48 | MAC SA |
| p_vlan_1_data | 16 | First VLAN tag |
| p_vlan_2_data | 16 | Second VLAN tag |
| p_l3_sip | 128 | L3 Source IP address |
| p_l3_dip | 128 | L3 destination IP address |
| p_l4_src_port | 16 | L4 source port |
| p_l4_dst_port | 16 | L4 destination port |
| P_l3_offset | 16 | Offset to the L3 header |
| P_l3_header_length | 16 | Length of the L3 header |
| P_l4_offset | 16 | Offset to the L4 header |
| P_l4_header_length | 16 | Length of the L4 header |
| P_l3_priority | 8 | L3 priority value (IP DSCP/TOS) |

The next table shows the pre-configured Protocol_Index values that is defined the default drivers for the Ethernet Controller. This is configurable and can be written:

TABLE 5

Protocol_index example

| Protocol_index value | Detected protocol | Comments |
|---|---|---|
| 0 | Not Used | Protocol not detected |
| 1 | mac_802_3 | Standard 802.3 packet |
| 2 | mac_802_3_ms_8 | Standard 802.3 packet, with MACSEC (8 bytes header) |

TABLE 5-continued

Protocol_index example

| Protocol_index value | Detected protocol | Comments |
|---|---|---|
| 3 | mac_802_3_ms_16 | Only used with Advanced Ethernet Controller<br>Standard 802.3 packet, with MACSEC (16 bytes header)<br>My be used with Advanced Ethernet Controller but this is not necessarily so |
| 4 | vlan_1_1 | First VLAN detected (with preconfigured VLAN EthernetType #1, for example 0x8100) |
| 5 | vlan_1_2 | First VLAN detected (with preconfigured VLAN EthernetType #2, for example 0x9100) |
| 6 | vlan_2_1 | Second VLAN detected (with preconfigured VLAN EthernetType #1, for example 0x8100) |
| 7 | vlan_2_2 | Second VLAN detected (with preconfigured VLAN EthernetType #12, for example 0x9100) |
| 8 | ipv4_frag_check | Internal, IPv4 detected |
| 9 | ipv4_no_frag | IPv4 without fragmentation |
| 10 | ipv4_frag | IPv4 with fragmentation |
| 11 | ipv6 | IPv6 |
| 12 | TCP | TCP |
| 13 | UDP | |
| 14 | GRE Tunnel | GRE Tunnel<br>Only used with Advanced Ethernet Controller |
| 15 | IPv6_over_IPv4 Tunnel | IPv6 over IPv4 Tunnel<br>Only used with Advanced Ethernet Controller |
| 16 | Ethernet with LLC SNAP encapsulation | |
| 31 | not detected | Protocol not detected |

Note:
The protocol_index values are configurable, the parser can be configured to map any detected protocol to any protocol_index value, see compare logic array database description above. Note that the software driver configures the compare logic array and the parser control table with a default set of protocols during initialization.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A system, comprising:
a processor; and
packet controller logic circuits coupled to the processor and implementing:
a distribution module;
multiple interleaved sequences of configurable parsing engines and concatenating modules forming configurable parsing engine and concatenating module pairs; and
an aggregation module;
wherein the distribution module is arranged to distribute an information unit between the multiple interleaved sequences of configurable parsing engines and concatenating modules, and apply a load balancing scheme in order to distribute the information unit,
wherein different portions of the information unit are processed by different configurable parsing engines,
wherein at least one configurable parsing engine is arranged to process a portion of the information unit in response to at least a previous processing result provided from a previous configurable parsing engine, and to generate a current processing result to be used by a next configurable parsing engine,
wherein the multiple interleaved sequences include a first interleaved sequence having at least two configurable parsing engine and concatenating module pairs, and
wherein at least a portion of the information unit is processed sequentially by the at least two configurable parsing engine and concatenating module pairs; and
wherein the aggregation module collects outputs from the multi-interleaved sequences.

2. The system according to claim 1, wherein each configurable parsing engine is arranged to be configured by receiving information unit portion limit metadata indicative of a location of an information unit portion to be processed by the configurable parsing engine.

3. The system according to claim 1, wherein each configurable parsing engine is arranged to be configured by receiving processing metadata indicative of a manner in which the information unit portion should be processed by the configurable parsing engine.

4. The system according to claim 1, wherein the current processing result comprises a command directed to the next configurable parsing engine.

5. The system according to claim 1, wherein different configurable parsing engines are configured to process information unit portions that relate to different protocol suit levels.

6. The system according to claim 1, wherein one or more configurable parsing engines is arranged to generate a current processing result to be used by another module of the system.

7. The system according to claim 1, wherein the current processing result is indicative of an offset to a header length indicator included in a portion of the information unit to be processed by the next configurable parsing engine.

8. A method comprising:
providing an information unit to packet controller logic circuits implementing a distribution module, an aggregation module, and multiple interleaved sequences of configurable parsing engines and concatenating modules forming configurable parsing engine and concatenating module pairs:
distributing the information unit between multiple interleaved sequences of configurable parsing engines and concatenating modules by applying a load balancing scheme in order to distribute the information unit;

processing different portions of the information unit by different configurable parsing engines; and collecting outputs from the multiple interleaved sequences, wherein the processing comprises processing, by at least one configurable parsing engine, a portion of the information unit in response to a previous processing result provided from a previous configurable parsing engine and generating a current processing result to be used by a next configurable parsing engine, wherein the multiple interleaved sequences include a first interleaved sequence having at least two sequential configurable parsing engine and concatenating module pairs, and wherein at least a portion of the information unit is processed sequentially by the at least two configurable parsing engine and concatenating module pairs.

9. The method according to claim 8, comprising configuring each configurable parsing engine by providing to the configurable parsing engine information unit portion limit metadata indicative of a location of an information unit portion to be processed by the configurable parsing engine.

10. The method according to claim 8, comprising configuring each configurable parsing engine by providing to the configurable parsing engine processing metadata indicative of a manner in which the information unit portion should be processed by the configurable parsing engine.

11. The method according to claim 8, wherein the current processing result comprises a command directed to the next configurable parsing engine.

12. The method according to claim 8, comprising configuring different configurable parsing engines to process information unit portions that relate to different protocol suit levels.

13. The method according to claim 8, comprising generating by one or more configurable parsing engines a current processing result to be used by another module of a communication controller.

14. The method according to claim 8, wherein the current processing result is indicative of an offset to a header length indicator included in a portion of the information unit to be processed by the next configurable parsing engine.

* * * * *